June 17, 1958 M. LEACH Re. 24,487

VIBRATING COUCH CONSTRUCTION

Original Filed March 14, 1957 3 Sheets-Sheet 1

INVENTOR.
MARK LEACH

BY

Robert A. Sloman
ATTORNEY

VIBRATING COUCH CONSTRUCTION

Original Filed March 14, 1957 3 Sheets-Sheet 2

INVENTOR.
MARK LEACH
BY
Robert A. Sloman
ATTORNEY

VIBRATING COUCH CONSTRUCTION

Original Filed March 14, 1957 3 Sheets-Sheet 3

INVENTOR.
MARK LEACH

BY

Robert A. Sloman
ATTORNEY

United States Patent Office

Re. 24,487
Reissued June 17, 1958

24,487

VIBRATING COUCH CONSTRUCTION

Mark Leach, Pontiac, Mich.

Original No. 2,822,804, dated February 11, 1958, Serial No. 646,140, March 14, 1957. Application for reissue March 4, 1958, Serial No. 719,178

13 Claims. (Cl. 128—33)

Matter enclosed in heavy brackets [ ] appears in the original patent but forms no part of this reissue specification; matter printed in italics indicates the additions made by reissue.

This invention relates to a massage couch and more particularly to an electrically operated vibration mechanism designed for simulating the effects of manual massage.

It is the primary object of the present invention to produce an electrically operated vibration couch which provides a series of variably located low horsepower motors carrying eccentrically mounted weights for providing controlled vibrations adapted to be transmitted through the couch support and directly to the user.

It is a further object of the present invention to provide a novel mounting for a plurality of variably arranged vibration producing electric motors together with novel means for transmitting the vibrations produced to the platform support of the couch.

It is the further object herein to provide a series of controls whereby some or all of the variably located sources of vibration may be energized.

It is a further object of the present invention to provide manual control means for regulating the speed of operation of the motors which have been energized depending upon the amplitude and frequency of vibration desired.

It is a further object of the present invention to provide a series of vibration producing means which may be operated at different speeds simultaneously if desired.

It is the further object of the present invention to provide a series of novel vibration pads which have floating mountings within predetermined spaced apertures which lie within the plane of the horizontal support platform, and to which are directed controlled vibrations produced by individual power operated vibrating means.

It is a further object of the present invention to provide novel mountings for the individual power operated means, and which include support plates resiliently mounted upon the couch frame, and with means provided supportably securing the vibration pads loosely within the support platform.

These and other objects will be seen from the following specification and claims in conjunction with the appended drawings in which:

Figure 1:
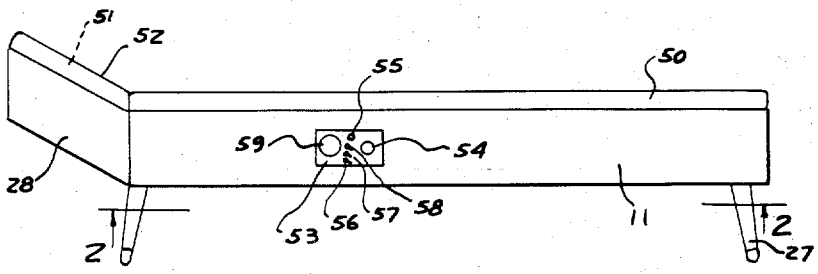
Fig. 1 is a side elevational view of the present massage couch.

It will be understood that the above drawings show merely a preferred embodiment of the invention, for illustration in accordance with the laws of the United States, and that other embodiments or variations are contemplated within the scope of the claims hereafter set forth.

The present power operated vibration or therapeutic couch consists of a hollow elongated rectangular frame which includes the elongated upright side members 11, and end members 21, preferably constructed of wood. The frame includes the upright cross member 12, of the same height as members 11, and suitably secured thereto; and additionally includes a pair of central longitudinally extending parallel engaging frame elements 13, and the pairs of transverse frame elements 14.

These frame elements and the additional frame elements 19 define within the main frame of the couch the series of compartments 15, 16, 17, 18 and 22.

Figure 2:
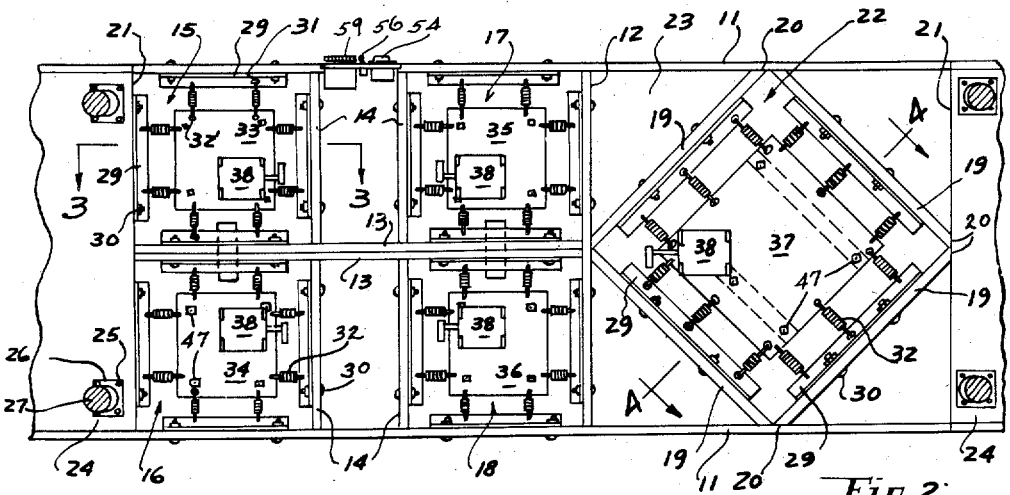
Fig. 2 is a bottom plan view, being a section taken on line 2—2 of Fig. 1, on an enlarged scale.

The couch frame includes the top support platform 23, preferably constructed of plywood, for illustration, and across the lower ends of the frame elements 11 are the leg support members 24, as shown in Fig. 2. Mounting brackets 26 for the legs 27 are suitably secured to the undersurfaces of end supports 24 by the fasteners 25. The frame construction also includes the upwardly inclined frame 28 at one end of the couch body which provides a raised portion defining the head rest.

Within the opposite end of said frame there are arranged a plurality of right angularly related upright frame elements 19 preferably of the same height as the other frame members, such as 11 and 12, whose respective tapered ends are arranged at a 45 degree angle with respect to frame members 11, 12 and 21 and suitably secured thereto as at points 20 thereby defining compartment 22.

Compartments 15 and 16 provide the vibration or massage means for the user's shoulders and back; compartments 17 and 18 provide the vibration means or massage mechanism for the user's hips and lower back, whereas compartment 22 provides the massage means for the calves and thighs of the user.

Within each of the compartments 15, 16, 17, 18 and 22, and lying in a common horizontal plane are a series of elongated angle members 29 or mounting means which are suitably secured to the adjacent framework which defines the respective side walls of the individual compartments. These angles members are secured in position by a plurality by fastening bolts and nuts 30 and may be constructed of a light metal such as aluminum. Said angles have formed therethrough at least a pair of spaced apertures 31 adapted to receive the reversed turned one ends of the series of coiled springs 32. Any other type of bracket mounting means or clips could be employed for said springs.

Arranged centrally within each of said compartments in spaced relation to the defining walls thereof, one in each compartment, are a series of substantially coplaner rectangular mounting plates 33, 34, 35, 36 and 37, which are preferably constructed of aluminum. Each of these plates have corresponding transverse apertures 32' adjacent their respective edges adapted to retainingly receive the reversed turned other ends of springs 32. To eliminate undesired noise or to produce a quiet operation, the said springs are preferably coated with a suitable plastic substance or a rubber layer. By this construction the mounting plates have at least a pair of spring supports for each of their four sides to thus provide floating mountings for the respective plates 33, 34, 35, 36 and 37 within their respective compartments.

Arranged off center and adjacent one of the corners of each of the respective mounting plates is a suitable electric motor 38, preferably a low horsepower motor.

In the present preferred embodiment 1/12 horsepower motors have been employed successfully. However, it is contemplated that, of course, the power of the motors can be varied and still remain within the low horsepower classification. Likewise the number of vibration pads and the number of motors may be varied.

These motors operate at a R. P. M. of approximately 1700 R. P. M., or on the other hand, may operate within the range of 5000 R. P. M. In any event, control means are provided for the said motors 38, in the manner hereafter described, whereby the speeds of rotation thereof may be selectively varied and additional control means are provided for the selective operation of said motors.

Figure 3:
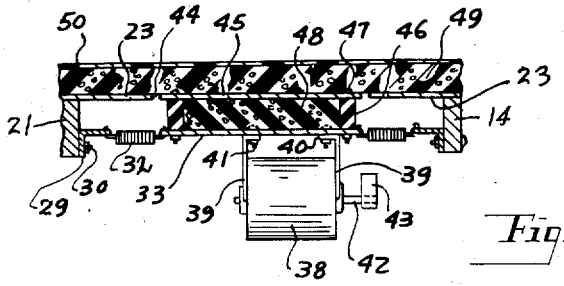
Fig. 3 is a section on an enlarged scale taken on line 3—3 of Fig. 2, illustrating the motor mounting.
Figure 4:
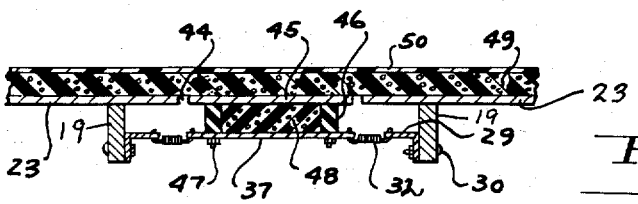
Fig. 4 is a section on an enlarged scale taken on line 4—4 of Fig. 2.

Suitable mounting means or support legs 39 project normally upwardly from the respective ends of the motors with their inturned legs 40 secured to the respective mounting plates such as plate 33 of Fig. 3 by a series of fasteners such as the bolts and nuts 41.

Suitable washers of a flexible or other nature may be incorporated within said fastening means.

Each of motors 38 has a driveshaft 42, and upon one end thereof an eccentrically mounted weight 43 for producing the desired and controlled vibrations for the respective mounting plate such as mounting plate 33 shown in Fig. 3.

As the arrangements of each of the respective mounting plates in the compartments is exactly the same only one thereof is described.

Referring to Fig. 3, there is formed within horizontal support platform 23 a series of spaced rectangular openings 44 within which are loosely nested respectively a series of rectangular vibration pads 45, preferably constructed of plywood.

These pads are the means of transmitting the desired vibrations and massage effects to the respective body elements, namely the shoulders and upper back corresponding to mounting plates 33 and 34, lower back and hips corresponding to plates 35 and 36; the thighs and calves corresponding to plate 37. There is a vibration pad similar to pad 45 corresponding to each of the other plates 34, 35, 36 and 37. Each such pad is nested loosely within an oversize opening in platform 23 similar to opening 44.

Each of the pads 45 corresponding to compartments 15, 16, 17, 18 and 22 is arranged so that at least a pair of their sides are parallel to the longitudinal axis of the couch. In the case of compartment 22, however, the respective sides of the corresponding vibration plate and pad are arranged at acute angles to the longitudinal axis, being 45 degrees in the present embodiment.

A series of spacers 46, are arranged adjacent the respective corners of mounting plate 33 and pad 45 and are interposed therebetween for securing the plate 33 and pad 45 together in parallel spaced relation employing a series of fasteners 47.

Similar spacers 46 are interposed between the respective other mounting plates 34, 35, 36 and 37 and their corresponding vibration transmitting pads, similar to pad 45 shown in Fig. 3.

In the present preferred device the spacers 46 are constructed of rubber, such as a hard rubber. However, these may be constructed of wood. Interposed between plate 33 and pad 45 is the soft sponge rubber spacer body 48, to thus complete the assembly and mounting for the floating vibration pad 45. The assembly is the same between corresponding plates and pads in the other compartments. *The body 48 may be omitted.*

Mounted directly above support platform 23, co-extensive of its complete area and also extending over the respective pads 45 is a relatively thick sponge rubber pad 49, which is suitably covered and retained on the support platform by the flexible plastic cover 50. In like manner, there is a sponge rubber cushion 51 for the head rest, which includes the plastic or other cover 52.

As a part of the present invention, the upward vibration thrusts transmitted to the respective vibration pads 45, etc., will be off center or laterally displaced from the center of weight concentration produced by the individual elements of the human body when the couch is in use. The advantage of this arrangement is that the individual weight concentrations of the user at various points of his body do not dampen or retard the vibrations of the individual pads, and accordingly do not interfere with the slapping action of said pads.

A control plate 53 is mounted on one side of frame 11 and includes the mounting for timer 54, the bulb 55, the three control switches 56, 57, 58 and the powerstat 59, which is a manually controlled variable transformer by which the voltage to the A. C. motors 38 may be regulated in turn regulating the speed i. e., the speed of these motors energized by switches 56, 57 and 58 selectively. If switch 56 is "on" only, then only the speed of the motors in compartments 15 and 16 is controlled. With all switches "on," then the speed of all motors is controlled simultaneously.

It is contemplated that other means may be employed for controlling the speed of rotation of the motors, such as one or more rheostats connected into the field windings of the motors to be controlled thereby. While only one powerstat or transformer is shown in the wiring diagram, Fig. 5 for simultaneously controlling the speed of operation of those motors which have been energized, it is contemplated that there may be individual powerstats or transformers for the individual motors or for groups of motors, so that these groups may operate simultaneously but at different speeds.

For illustration, switch 56 is adapted to control simultaneously the energization of the pair of motors within compartments 15 and 16. Switch 57 controls the motors in compartments 17 and 18, and switch 58 controls the single motor within compartment 22.

In Fig. 1, bulb 55 when lighted indicates that power is available in the electrical circuit. One or all of the switches 56, 57 and 58 may be activated for controlling the operation of the individual motors or groups and the timer 54 is arranged in the circuit for determining the period of energization of those motors which have been switched "on."

The powerstat 59 of variable voltage transformer provides a convenient manual means for regulating the speed of operation of the motors and the extent of amplitude of the vibrations produced.

Figure 5:
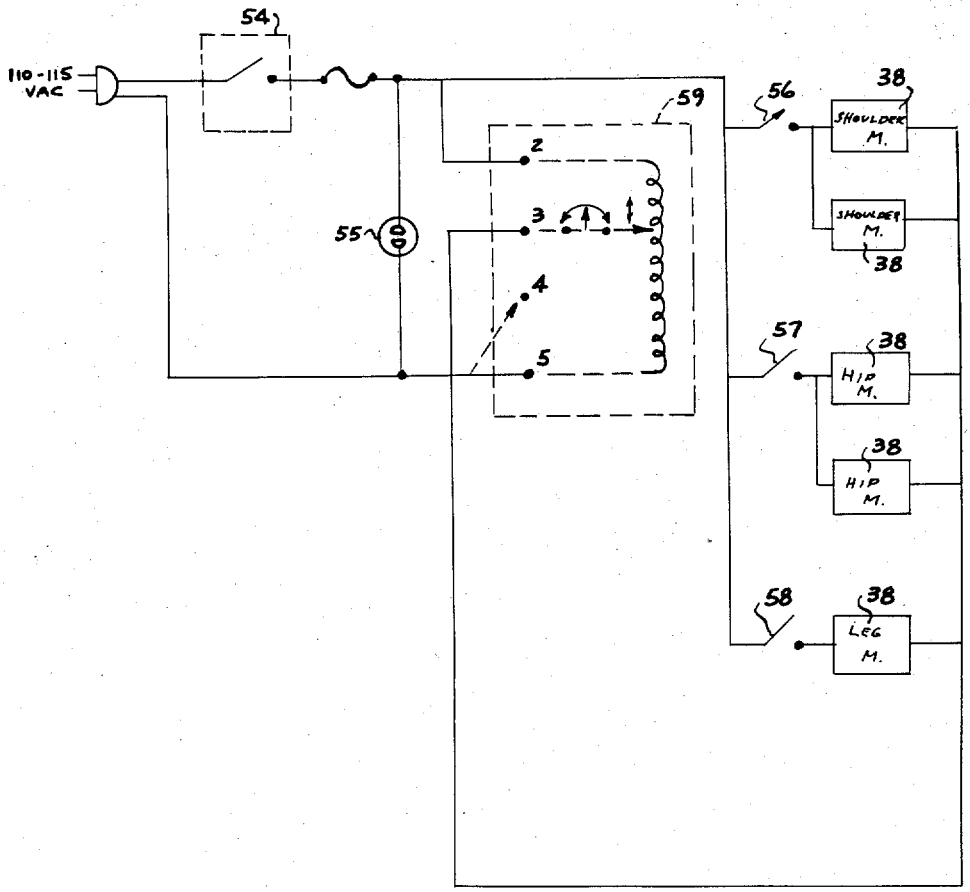
Fig. 5 is a wiring diagram for the present power operated vibrations mechanism illustrated in Fig. 2.

Specifically referring to Fig. 5, the electrical circuit includes a suitable plug for connection to a 110–115 volt source of A. C. current. One of the leads connects the timer 54 and a suitable protective fuse and continues to the three switches 56, 57 and 58 for the respective electric motors 38.

A branch from this lead joins contact #2 of the powerstat 59 diagrammatically indicated and which includes a main coil whose ends interconnect contacts 2 and 5.

The return wire to the source of electric power also joints contact #5. At the same time contact #3 from the powerstat is connected by suitable lead to the other sides of the respective motors. The powerstat 59 is in the nature of an auto transformer which has merely a single coil between the contact points 2 and 5.

The rotatable control member has a contact which is adapted to move over portions of said coil whereby the voltage take off contact 3 may be regulated between zero and 140 volts. A suitable stop is provided in conjunction with the rotatable members of the powerstat so that the output voltage will have a minimum of at least 60 volts, being the minimum starting voltage for said motors. In this case, for illustration a 1/12 horsepower motor 38 is employed having a maximum R. P. M., in the range of 1700.

Figure 6:
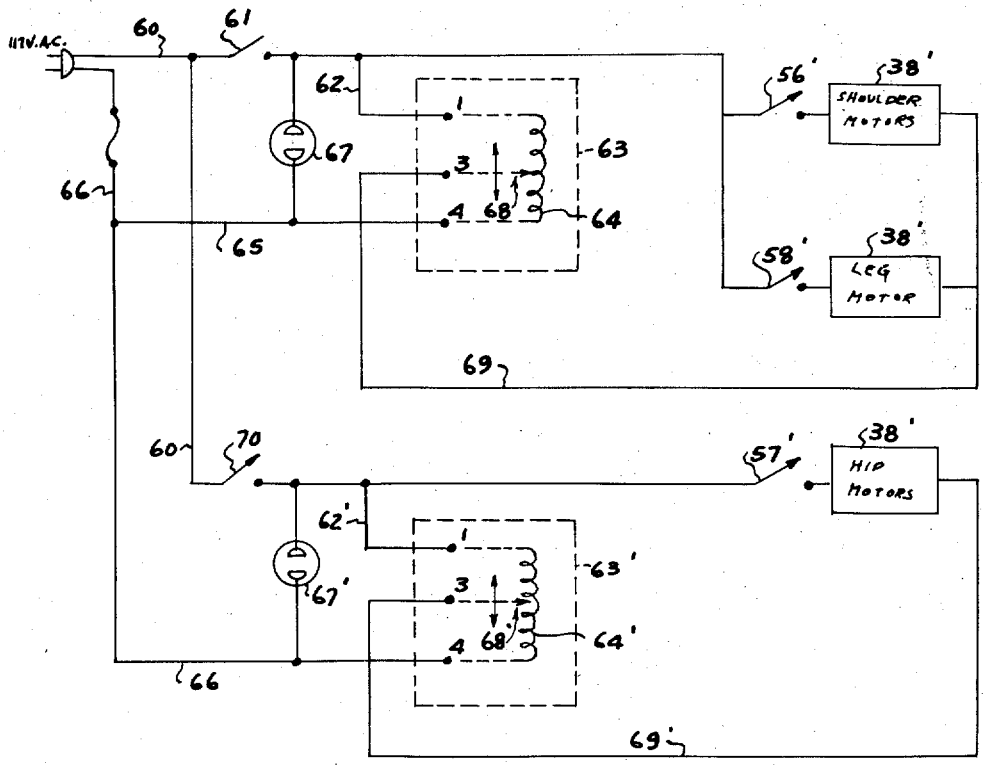
Fig. 6 is a slightly different form of wiring diagram.

In Fig. 6, there is shown a slightly different form of wiring diagram which employes a pair of auto transformers 63 and 63'. One of the power leads 60 through switch 61 is directed to the pair of "off" and "on" switches 56' and 58' which control the energization respectively of the two shoulder motors 38' and the single leg motor 38'.

The branch 62 connects contact No. 1 of the powerstat or auto transformer 63. The single coil 64 therein interconnects contacts one and four and the return branch 65 joins the power lead 66. The movable control member 68 within the transformer is joined to contact No. 3 which through lead 69 joins the opposite sides of the above mentioned motors 38'.

Branch power line 60 through manual switch 70 and a second control switch 57' joins the pair of hip motors 38'. Branch 62' directs power to contact No. 1 of the second auto transformer 63', whose coil 64' interconnects contacts 1 and 4 thereof. The circuit is completed through the main power line 66. The adjustable member 68' moves over portions of coil 64' and connects contact No. 3 which through the lead wire 69' connects the opposite side of the hip motors 38'.

The diagram shown in Fig. 6 thus provides a means whereby the shoulder motors and the leg motors may be operated at one speed or at controlled different speeds whereas the separate hip motors through a different transformer may simultaneously operate at the same or different speeds.

Neon pilot light 55, Figure 5, and similar lights 67 and 67', Figure 6, are provided to indicate the electrical circuits are energized.

Having described my invention, reference should now be had to the following claims:

1. A massage couch comprising a hollow horizontally disposed frame on legs including a series of variably spaced compartments, a horizontal support platform bridging said frame and secured thereto, there being a series of enlarged apertures of predetermined shape formed through said platform, one aperture for each compartment arranged centrally thereof, a similarly shaped vibration pad loosely nested within each aperture within the plane of said platform, a mounting plate parallel to and spaced below each pad, a series of spacers between each pad and plate and interconnected therewith, [a resilient body snugly nested between each pad and plate co-extensive with their opposed surfaces,] a plurality of resilient means interconnecting spaced marginal portions of said plates with corresponding portions of said frame within individual compartments for yieldingly supporting said plates loosely therein, a vibration producing motor with an unbalanced shaft arranged off center with respect to each plate and suspended therefrom, and relatively thick flexible and resilient cover means snugly extending over the surface of said platform and over the pads.

2. The massage couch of claim 1, said compartments being defined by a series of angularly related cross members secured within said frame, there being a pair of laterally arranged compartments adjacent one end of the frame corresponding to the shoulders and back of the user, an intermediate pair of laterally arranged compartments corresponding to the lower back and hips of the user and a single compartment adjacent the other end of said frame corresponding to the user's thighs and calves.

3. The massage couch of claim 1, the location and number of pads within the support platform and the number of compartments within said frame corresponding to the desired number and location of vibration sources.

4. The massage couch of claim 1, said platform and pads being constructed of a uniform thickness plywood.

5. The massage couch of claim 1, the spacers between said pads and plates being constructed of hard rubber.

6. The massage couch of claim 1, the resilient *cover means including a layer of sponge rubber.* [Body between said pads and plates and the cover for said platform being of sponge rubber.]

7. The massage couch of claim 1, the resilient mountings for said motor supporting plates consisting of a series of horizontally disposed coiled springs connected to all sides of said plates.

8. The massage couch of claim 1, the resilient mountings for said motor supporting plates consisting of a series of horizontally disposed coiled springs connected to all sides of said plates, and a plurality of spaced mounting means secured to portions of said frame defining said compartments to which said springs are anchored.

9. The massage couch of claim 1, and a series of coplaner elongated angle members secured to said frame upon the interior walls which define each compartment and having spaced apertures therethrough, said resilient means consisting of a plurality of coiled springs anchored through said angle member apertures.

10. The massage couch of claim 1, a control panel on said frame, a variable transformer adapted for connection to a power source, and an electrical circuit interconnecting said motors and transformer, whereby on regulation of said transformer the speeds of said motors and the resulting frequency and amplitude of vibrations are manually controlled.

11. The massage couch of claim 1, a control panel on said frame, variable transformer means adapted for connection to a power source, and a series of electrical circuits each interconnecting said transformer means and said motors, whereby on adjustment of said transformer means the speeds of the respective motors may be regulated for operation at the same and at simultaneously different speeds.

12. The massage couch of claim 1, the centers of said pads being laterally displaced from the predetermined points of weight concentration of the user's body whereby said points of weight concentration in their relative displacement provide for appreciable slapping of said pads.

13. The massage couch of claim 1, an electric circuit interconnecting said motors, a manually controllable transformer adapted for connection with a power source and connected into said circuit, and a series of control switches in said circuit for selectively energizing said motors, operation of said transformer regulating the speed of operation of the energized motor and in turn the frequency of amplitude of vibration of said motor mounting plates and said pads.

References Cited in the file of this patent or the original patent

UNITED STATES PATENTS

| | | |
|---|---|---|
| 2,715,900 | Posner | Aug. 23, 1955 |
| 2,715,901 | Blake | Aug. 23, 1955 |

FOREIGN PATENTS

| | | |
|---|---|---|
| 637,371 | Canada | May 1, 1956 |